United States Patent Office

2,777,797
Patented Jan. 15, 1957

---

2,777,797

VITAMIN PRODUCTS

Melvin Hochberg, North Arlington, and Melvin J. MacMillan, Cranford, N. J., assignors to Nopco Chemical Company, Harrison, N. J., a corporation of New Jersey No Drawing. Application June 4, 1952,
Serial No. 291,796

8 Claims. (Cl. 167—81)

This invention relates to novel compositions of matter and to methods for preparing them. More particularly the invention is directed to novel and highly useful compositions of matter containing certain fat-soluble vitamins, namely vitamin A and/or vitamin D, and also to methods for preparing them. In one of its more specific aspects, the invention is directed to novel compositions of matter containing either or both of said particular vitamins, with said novel compositions being of particular size range and with said vitamins being highly stable therein and being readily available or digestible.

Stock and poultry feeds as well as human feeds have been fortified with said vitamins for many years, but such feeds have been subject to considerable loss of nutritive value especially with regard to vitamin A, because vitamin A is unstable due to the oxidizing influences of the atmosphere and because both vitamins A and D are unstable to the influence of components of certain feeds with which they are to be mixed. In the prior art proposals, a number and varied attempts have been made to protect said vitamins but none of the proposed products has been entirely satisfactory, either because of the unstable nature of the products or the biological unavailability of the vitamin A therein, or the indigestibility of the products for the vitamin A content thereof, or for one or more of various other reasons known to those well versed in the art.

It is the object of this invention to provide new and improved dry carriers for fat-soluble vitamins.

A further object of this invention is to provide fat-soluble vitamin-containing products in a dry form which are highly resistant to oxidative deterioration.

Still another object of this invention is to provide a composition of matter containing vitamin A or D in such a manner as to be highly stable and readily available.

An additional object of the invention is to provide dry carriers for fat-soluble vitamins which when admixed with stock and poultry feeds or with human foods will fortify such materials with fat-soluble vitamins in such a manner that these materials will retain their fat-soluble vitamin potency for longer periods of time even when the fortified products are stored under conditions conducive to oxidative deterioration of the fat-soluble vitamins.

Other objects of the invention will in part be obvious and will in part appear hereinafter.

It has now been discovered that the above and other objects of the invention may be accomplished by providing a dry free-flowing product made up of a multiplicity of very small spheroidal particles, each particle comprising an intimate admixture of a fat-soluble vitamin material, an edible antioxidant, a vegetable flour and a normally solid wax-like material having a melting point of at least about 45° C. or over. The term "spheroidal" is used herein to include not only particles which are spheroidal in shape but also particles which are truly spherical in shape, and the term "wax-like material" is used herein to connote normally solid glycerides, other fatty acid esters, free fatty acids, vegetable waxes, mineral waxes, and similar materials or mixtures of such materials. Other ingredients such as synergists for the antioxidant, materials such as vegetable dyes, etc., may be incorporated into the products of the invention if desired.

The compositions of the invention contain the fat-soluble vitamins in such a manner that said vitamins are readily available and also highly resistant to oxidative destruction as is evidenced by the fact that the vitamin potency of the products of the invention is substantially undiminished even after the products have been stored for long periods of time. What is even more significant, however, is the fact that stock and poultry feeds and human foods which have been enriched with vitamins by the addition of the products of our invention thereto are extremely stable and very little loss of the added vitamin potency occurs even when these enriched products are stored for periods of from six months to a year or longer under conditions which are very conducive to oxidative destruction of the vitamins. Thus it is now possible by utilizing the products of our invention to prepare vitamin-enriched stock or poultry feeds and then ship such feeds for long distances and subsequently store them for long periods of time before they are sold to the ultimate consumer. Prior to our invention, feeds enriched with readily available vitamin A would not retain their vitamin A potency for a practical storage period, but with our products it is possible to prepare such enriched feeds which will retain their vitamin A potency for long periods even at summer temperatures.

The loss of vitamin potency which occurs when products containing readily available fat-soluble vitamins are stored for long periods of time is commonly referred to as "oxidative" destruction of the vitamins. Actually, however, it is very likely that at least part of the loss of vitamin potency is due to destruction of the vitamins by means other than ordinary oxidation. In all probability other ingredients in the composition containing the vitamins in some manner or other catalyze the transformation of the vitamins to physiologically inactive compounds. However, it is the usual practice to refer to the sum total of any losses of vitamin potency which show up by any of the usual methods of analysis such as bioassay or chemical or physical methods of analysis as being oxidative destruction of the vitamins. We have adhered to this practice in the description of our invention.

In preparing the products of our invention, the normally solid wax-like material is melted and the fat-soluble vitamin-containing material which is to be employed is then admixed therewith along with the edible antioxidant and the vegetable flour which are to be incorporated into the products. Thereafter the liquid mixture which has thus been prepared is formed into a multiplicity of very small solid spheroidal particles by any suitable method. Such a liquid mass contains all of said components, substantially uniformly distributed with respect to each other. While in said condition at elevated temperature, the mass, in any convenient and desired manner, is converted or formed into droplets or small globules whose temperature is reduced to convert them to the solid state or to cause solidification thereof.

There are two general methods for preparing such particles which we have found to be highly satisfactory but means other than these two methods can, of course, be used. One of the methods by which the desired spheroidal particles may be prepared involves a process which we shall refer to as a "centrifugal" process. In such a process the melted mixture of the ingredients which make up the compositions, that is the mixture of said four essential components of the invention is in the liquid state at elevated temperature with the components being substantially uniformly distributed throughout, is placed in or fed into a rapidly rotating vessel, the sides of which contain numerous small perforations. Such perforations may be placed along the upper part of the vessel or they may be placed anywhere along the sides of the vessel. Also, either a vessel which is substantially a cylinder or a vessel which is in the shape of an inverted cone with the perforations only at the top part of the sides of the cone may be used. As the vessel rapidly rotates, the melted mixture will flow out of the perforations in the side of the vessel and will be thrown for a considerable distance through the air, e. g. about 10 to 15 feet or more, due to the centrifugal force. As the melted mixture passes through the perforations in the sides of the vessel, it is broken up into a multiplicity of very small spheroidal particles. These particles, which are liquid when they leave the vessel, cool very rapidly as they pass through the air, and by the time they fall to the floor of the room in which the rotating vessel is located they will have substantially solidified, and under practically all conditions it will be found that these solid particles will be practically perfect spheres. In some cases, the particles will not be true spheres but they will be so nearly so that they are properly described as being spheroidal in shape. In the other method which we prefer to employ in forming the spheroidal particles which make up the compositions of our invention, we pass the melted mixture of ingredients through a spray gun or similar spraying device. As the finely sub-divided liquid particles pass through the atmosphere after being forced through the spraying device, they rapidly cool and form solid spheroidal particles just as in the case when the melted mixture of ingredients is passed through a centrifugal device of the type described above. In both of these processes the melted mixture of ingredients is preferably at a temperature such that the mixture flows readily and will flow through the perforations of the rapidly rotating vessel or through the spray device without tending to clog the perforations of the rotating vessel or the openings in the spray device. The speed at which the centrifugal apparatus is rotated may vary, of course, but we have found that a rotation of from about 200 to about 1500 revolutions per minute will give very satisfactory products. The pressure which is used in the various types of spraying devices can vary to some extent, of course, although in all cases sufficient pressure will be required to cause the hot liquid mixture to be broken up into very small droplets. These droplets cool quite rapidly as they pass through the air, and by the time they fall to the floor of the room in which the spray device is located, they will have formed a multiplicity of small solid spheroidal particles. The spray device may conveniently be located near the ceiling of the room having a rather high ceiling or it may be located near the top of a tall tower with the nozzle of the spray device being directed downwardly. However, such an arrangement is not necessary; and, if desired, one may locate the spray device on or near the floor of the room in which the spray device is placed. The nozzle of the spray device is then directed so that the initial path of the droplets will be at least parallel to the floor of the room or at an angle slightly above a line parallel with the floor of the room. Of course, in such a case the pressure which is employed in forcing the hot liquid mixture through the spray device will have to be high enough to cause the small droplets which are formed to travel through the air for a distance sufficient to allow the droplets to solidify substantially before they fall to the floor of the room. In most cases it is preferred either that the spray device be placed so that the droplets will have a free fall from the spray device to the floor of the room of from about 15 to 20 feet or more or that sufficient pressure be employed in the spray device to force the droplets through the air for a similar distance before they fall to the floor of the room. In most cases a pressure of about 10 pounds per square inch is satisfactory when the droplets are allowed to cool by a free fall through the air. Pressures of from about 5 to about 100 pounds per square inch may be used, however, if desired. When the spray device is located on or near the floor of the room and the hot liquid mixture is sprayed out in a direction roughly parallel to the floor of the room, it is usually desirable to employ a pressure of at least about 15 pounds per square inch in the spray device in order to insure that the individual droplets will pass through the air for a distance sufficient to allow them to solidify substantially before they fall to the floor of the room. The perforations in the centrifugal apparatus and the openings in the spray device are designed or adjusted so as to give solid spheroidal particles having a diameter such that the majority of the particles will pass through a 10 mesh screen but will not pass through a 100 mesh screen. In the centrifugal type devices, perforations in the sides of the vessels having a diameter of from about $\frac{1}{16}$ to about $\frac{1}{32}$ of an inch will ordinarily give satisfactory products. The size of the openings in the spray type devices will depend somewhat upon the amount of pressure being used to force the melted mixture through the devices. Such devices can be readily adjusted in every case, however, to give spheroidal particles of the desired size.

In nearly all cases, the spheroidal particles which are obtained will be free-flowing and will not tend to adhere to each other to any appreciable extent. If it is found that the spheroidal particles do have a tendency to adhere somewhat to each other, such tendency may be readily overcome merely by dusting these particles with a very small amount of a vegetable flour such as one of the vegetable flours used in the compositions of our invention.

The normally solid wax-like materials which are used in preparing the products of the invention can be selected from glycerides and other fatty acid esters, fatty acids, vegetable waxes, or petroleum waxes or mixtures of such materials which have a melting point of about 45° C. or above. Among such materials are hydrogenated fats and oils such as coconut oil, cottonseed oil, peanut oil, soybean oil and fish oils, fatty acids such as stearic acid, mineral waxes as the various petroleum waxes, vegetable waxes such as carnauba wax, candelilla wax, esparto wax, ouricury wax, etc. The hydrogenated fats and oils which are preferably employed are those having very low iodine values, that is, below 10 and for certain purposes approximately zero. In all cases, the melting point of the wax-like material used is at least about 45° C. For certain uses of the novel compositions of this invention, the wax-like materials having high minimum melting points such as 60° C. and 70° C. are employed. Consequently, in one of the embodiments of the invention, the melting point of the wax-like material is at least 45° C., while in two other embodiments, it is at least 60° C. and at least 70° C. respectively. The percentage of the normally solid wax-like material present in the compositions of this invention may be in the range of 10–75% depending upon the specific characteristics and proportions of the other components therein. For chiefly commercial purposes, however, the percentage of the normally solid wax-like material in the compositions of this invention is in the range of 15–60% by weight.

In the production of the products of our invention, it is possible to use fat-soluble vitamin-containing materials which have a potency substantially lower than the potency of the fat-soluble vitamin-containing materials which must be used with products such as those prepared according to U. S. Patent 2,401,293. If desired, of course, one may use highly potent fat-soluble vitamin concentrates in preparing the products of our invention, and if it is desired to obtain dry carriers having a very high potency, it is preferred to employ highly potent fat-soluble vitamin concentrates in preparing such carriers. In preparing dry carriers which are to be added to stock and poultry feeds to enrich the fat-soluble vitamin content thereof, it is not necessary to use highly potent fat-soluble vitamin concentrates but instead fat-soluble vitamin-containing oils having a low vitamin potency may be used. Many stock and poultry feeds are fortified with vitamin A so that they will have a potency of approximately 5 units of vitamin A per gram. To prepare dry carriers suitable for fortifying feeds to such an extent, we can use fat-soluble vitamin-containing oils having a rather low potency inasmuch as dry carriers prepared for such use need not have a potency in excess of about 1000 or 2000 units of vitamin A per gram. As a source of the fat-soluble vitamins, we may use any of the natural or artificially produced vitamins A or D. We may use activated sterols such as irradiated ergosterol or irradiated 7-dehydrocholesterol, vitamin A in alcohol or ester forms, vitamin A which has been produced by synthetic methods, fish oils, fish liver oils or vitamin concentrates prepared therefrom, etc. Also, instead of using vitamin A in our products we may use precursors of vitamin A such as carotene. The amount of fat-soluble vitamin material in the compositions of our invention can vary from any desired minimum amount up to as much as about 60% of the total weight of the compositions. The fat-soluble vitamin material employed in the production of the compositions of this invention is such material which when mixed with an appropriate amount of said wax-like material and the mixture is heated above the melting point of the wax-like material, the mass at that temperature will be liquid; and when such mass is cooled to room temperature it will be substantially solid and uniform throughout and in the form of what in general may be termed a substantially solid solution. In most cases we prefer that the products of our invention, which are carriers for vitamin A, have a potency of at least about 1000 units of vitamin A per gram and that the products of our invention which are carriers for vitamin D have a potency of at least about 100 units of vitamin D per gram.

Among the antioxidants which may be incorporated into the products of our invention, there may be mentioned compounds such as propyl gallate, butylated hydroxy anisole, gallic acid, nordihydroguaiaretic acid, etc. These compounds are all edible antioxidants. Also, one can use other edible antioxidants such as vitamin E, mixed tocopherols and natural antioxidants of the types described and claimed in the U. S. Patents No. 2,345,576, No. 2,345,578, No. 2,433,593 and No. 2,434,790, natural antioxidants produced by the processes described and claimed in the U. S. Patents No. 2,396,680 and No. 2,396,681 as well as any similar edible antioxidants. In fact any edible antioxidant can be employed if desired. Also, one can use mixtures of any of these antioxidants, or one can use mixtures of one or more of these various antioxidants with a compound or compounds having little or no antioxidant effect in themselves but which when admixed with any of the antioxidants exert a synergistic effect thereon. Such compounds, which are often referred to as "synergists," are lecithin, citric acid, alkyl phosphates, etc. As far as the amount of antioxidant which is to be incorporated into the products of our invention is concerned, it is preferred to use at least about 0.05% of antioxidant in most cases, but, of course, the amount of antioxidant which is used will depend to some extent upon how effective the antioxidant is. In most cases, the amount of antioxidant which is used will make up from about 0.05% to about 1.0% of the compositions of the invention. When referring to the antioxidants as "edible" we mean that they may be eaten in the quantities in which they are used as antioxidants by either humans or animals without any deleterious effects resulting therefrom. The antioxidant employed in the production of the compositions of this invention is such that when mixed with appropriate amounts of said wax-like material and said fat-soluble vitamin material, and the mixture is heated above the melting point of the wax-like material, the mass at that temperature will be liquid; and when such mass is cooled to room temperature it will be substantially solid and uniform throughout and in the form of what in general may be termed a solid solution.

The products of our invention contain a vegetable flour as one of the essential ingredients. The amount of vegetable flour which is incorporated into the products can vary, of course, but in no case should it exceed about 50% of the final product and preferably it should not make up more than about 35% of the final product. Preferably, the vegetable flour should make up at least about 5% of the final product. The flour which is incorporated into the compositions aids a great deal in maintaining the stability of the vitamins in the compositions. It is not known just how the flour aids in maintaining the stability of the vitamins, but we have found that the flour does have such an effect. The vegetable flour also aids in making the vitamins in the products more readily available to the animal or human which eats the feed or the food which is enriched with these products. It seems that the vegetable flour tends to absorb moisture and thus when the products of our invention pass into the stomach of an animal or man the vegetable material will absorb water from the digestive juices in the stomach and in so doing the vegetable material will, of course, expand and as it expands it will tend to rupture and break up the spheroidal particles which make up the dry vitamin carriers. When these spheroidal particles are broken up, the vitamins therein become much more readily available for absorption from the digestive tract into the blood stream. The vegetable flour aids in another manner in making the vitamins more readily available for absorption from the digestive tract since the particles of vegetable flour are very readily digestible and as they are acted upon by the digestive juices in the stomach and intestine they tend to leave the spheroidal particles of the vitamin carrier in more or less of a honeycombed condition thus causing a much greater surface area of the dry carrier to be exposed to the action of the digestive juices. This, of course, makes the vitamins in the dry carriers much more readily available to the digestive tract.

Among the many vegetable flours which can be employed in preparing the compositions of our invention are finely ground soybean meal, corn germ meal, cottonseed meal, linseed meal, wheat germ meal, corn meal, alfalfa leaf meal, wheat bran, oat meal, peanut meal, bolted rice polish, wheat flour, etc. The vegetable flour consists of rather finely divided particles of the vegetable material, the majority of which will pass through a 60 mesh screen and in most cases it is preferred that practically all will pass a 60 mesh screen and the majority of the particles be of a size such that they will pass through a 100 mesh screen.

It has not been definitely determined just why the products of our invention are far more stable than any of the products known in the prior art. The composition of our products is somewhat similar to some of the prior art products insofar as the nature of the ingredients used therein is concerned, as is readily apparent from a comparison of the ingredients of our products with the ingredients of some of the products of the prior art discussed hereinabove. However, our products are signally different from the prior art products in that the ingredients are intimately combined with each other in a truly novel relationship whereby the availability or digestibility and also the stability of the fat-soluble vitamin content thereof are established for substantially all practical commercial purposes. It has been definitely established that the products of our invention have a far greater degree of stability than any of the products previously known in the prior art, and our products are the only ones we have found which when admixed with stock or poultry feeds will substantially retain their original vitamin potency for periods of time of from six months to a year or longer. The fact that our products are formed into a very great number of very small spheroidal particles coupled with the general method for producing them probably has a great deal to do with their outstanding superior stability. The compositions of the prior art are formed either by grinding or otherwise comminuting large sized masses of the prior art products. Such subdivision of these prior art products gives particles having a much larger surface area per unit weight than is the case with our products; however, we do not believe that the outstanding superiority of our products can be attributed entirely to their physical form although we have found that the spheroidal shape of the individual particles which make up our products does appear to contribute significantly to the stability of the products. For one thing it may be that in the formation of the individual spheroidal particles, more or less of a case-hardening effect makes the surface of the individual spheroidal particles far more resistant to penetration by oxidizing influences than would otherwise be the case. Just exactly why our products are so much more stable than the prior art products has not yet been definitely determined, and therefore we do not wish to be bound by any particular theories as to what is the actual reason or reasons for their highly superior stability.

Accordingly, this invention may be practiced by intimately combining (a) one or a combination of two or more of said wax-like materials, (b) one or a combination of two or more of said fat-soluble vitamin A and/or D containing materials preferably in the liquid state, (c) one or a combination of two or more of said vegetable flours, and (d) one or a combination of two or more of said antioxidants. Said substances a, b, c and d are so proportioned that (c) is present in amount equal to 5–50% by weight of the total mass, and (a) is present in amount equal to 15–60% by weight of the total mass, with the ratio by weight of (c) to the combined weights of (a) and (b) being in the range of approximately 1–1 to 1–19. Such intimate combinations of said components in the aforesaid proportions must all be in the fluid state when a mass thereof is at elevated temperature slightly above the melting point of the wax-like material. While above the melting point of the wax-like material, said mass in the fluid state may, at elevated temperature, said mass in the fluid state may, by any appropriate means such as a stirrer or other device, be agitated or mixed to substantially uniformly distribute the separate components with respect to the other and thus obtain the intimate admixture desired. While at elevated temperature and said components so uniformly distributed, the mass in the fluid state is converted or formed into droplets or globules whose temperature is reduced to convert them from the fluid or liquid state to the substantially solid state whereby the solid particles so produced are substantially all passable through a 10 mesh screen and are in most part retainable on a 100 mesh screen. These solid particles are essentially spheroidal particles resembling very small wax-like beads in appearance, with (a), (b), and (d) being in what in general may be termed solid solution as a continuous phase or matrix having a large number of individual particles of (c) substantially uniformly suspended therein and as discrete particles. One of the specific procedures which has been employed to provide such combinations of (a), (b), (c) and (d) in the fluid state is to first charge the required amount of (a) into a vessel which is heated to or slightly above the melting point of (a) to convert it from its normally solid state to the liquid state and then charging into said (a) in the liquid state a previously prepared mass of (b), (c) and (d) in the proportions heretofore set forth and which mass is at about the same temperature as (a) in said vessel. If desired, the ingredients may be combined in any other convenient order. This resultant mass is thoroughly mixed at said elevated temperature and is now at said temperature ready for conversion into droplets or globules by means of spraying either by centrifugal spraying or pressure spraying or any other convenient apparatus for that purpose. Said resultant mass, which is substantially uniform throughout and at said elevated temperature, is formed into globules or droplets by spraying; and the temperature of said globules or droplets is reduced to convert them from the fluid to the substantially solid state.

For a fuller understanding of the nature and objects of the invention, reference may be had to the following examples which are given merely as further illustrations of the invention and are not to be construed in a limiting sense. All vitamin potencies are expressed in U. S. P. units unless otherwise specified.

*Example I*

A very stable dry carrier of vitamin A was prepared from a vitamin A concentrate, esparto wax, an edible antioxidant and wheat germ flour. The antioxidant employed was nordihydroguaiaretic acid. The product was prepared by heating to about 80° C. 20 parts of esparto wax having a melting point of about 70°–75° C. and then admixing therewith 10 parts of the vitamin A concentrate, 18 parts of wheat germ flour and 0.06 part of the antioxidant, all of which had been preheated to about 80° C. There was also added to the mixture 0.06 part of citric acid to serve as a synergist for the antioxidant. The hot liquid mixture was then placed in a rapidly rotating (about 1500 R. P. M.) vessel having holes in the side thereof of a diameter from about 1/16 to about 1/32 of an inch and the liquid mixture was allowed to flow out through these holes. As the liquid mixture was allowed to flow it passed through the air and rapidly solidified, and by the time the individual droplets had fallen to the floor of the room in which the rapidly rotating vessel was located they had formed solid spheroidal particles. These particles had a very slight tendency to adhere to one another and therefore they were dusted with a mixture made up of 2.20 parts of wheat germ flour, 0.06 part of the antioxidant and 0.06 part of citric acid, employing 1 part of this mixture for each 20 parts of the spheroidal particles. The product which was obtained was assayed for vitamin potency and found to contain 203,000 units of vitamin A per gram. The product was then tested for its stability to the oxidizing influences of the atmosphere by subjecting the product to an accelerated storage test. The product was stored in contact with the atmosphere at a temperature of 45° C. for six weeks. At the end of that time assays showed that the product had a vitamin A potency of 184,000 units of vitamin A per gram. The fact that only approximately 9% of the vitamin A was destroyed under the very severe conditions of storage which were employed clearly demonstrated that the product was exceedingly resistant to the oxidative influences of the atmosphere.

*Example II*

Another dry carrier for fat-soluble vitamins was prepared by melting 22.5 parts of microcrystalline wax having a melting point of about 88° C. to 90° C. and then admixing therewith 30 parts of fish liver oil, 20 parts of ground expeller soybean meal, and 0.13 part of an antioxidant of the type employed in Example I along with 0.33 part of soybean lecithin as a synergist therefor. The product was formed into a multiplicity of small spheroidal particles by passing the hot liquid through a centrifugal type apparatus as in Example I. Forty parts of the spheroidal particles were admixed with 42 parts of expeller soybean meal. The resulting product had an initial potency of 2200 units of vitamin A per gram, and after three months' storage at 30° C. in contact with the atmosphere the product assayed 1930 units of vitamin A per gram. Ten parts of the product obtained by admixing the spheroidal particles with expeller soybean meal were admixed with 90 parts of a mineral mixture prepared by admixing 40 parts of ground limestone, 40 parts of steamed bone meal and 16 parts of salt. All three of these minerals have a strong tendency to cause the destruction of vitamin A. The resulting product initially assayed 248 units of vitamin A per gram and after two months' storage at 37° C. in contact with the atmosphere, it assayed 250 units of vitamin A per gram. It is apparent from the two accelerated storage tests carried out on the product of the present example that this product contained the vitamin A therein in a form highly resistant to oxidative destruction.

*Example III*

Four dry carriers for fat-soluble vitamins were prepared in the same manner as in Example II. The antioxidant employed in the product of Example II was replaced in the four products of the present example with propyl gallate, gallic acid, butylated hydroxy anisole, and a mixture of natural tocopherols respectively. Each of these four products had the same excellent stability and resistance to oxidative destruction of the vitamins therein as the product of Example II.

*Example IV*

Another product of the invention was prepared as in the previous examples by heating to about 95° C. 150 parts of a microcrystalline wax having a melting point of about 88° C. to 90° C. (sold by the Bareco Oil Company under the trade name of "Be Square Amber Wax"), and then admixing therewith 149.2 parts of fish liver oil containing 55,000 units of vitamin A per gram, 0.78 part of vitamin D concentrate containing 2,150,000 units of vitamin D per gram, 3 parts of an antioxidant of the type employed in the previous examples along with 7.5 parts of lecithin to serve as a synergist therefor, and 126.2 parts of wheat germ flour, all of which had been preheated to about 93° C. The hot liquid product was thoroughly admixed and then passed through a centrifugal apparatus of the same type as was employed in the previous examples. To determine the stability of the vitamin A in the solid spheroidal particles which were obtained, two different storage tests were conducted. In the first test 263 parts of the solid spheroidal particles were admixed with 151 parts of wheat germ flour, 45.4 parts of soybean meal and 448.3 parts of linseed meal. This mixture was assayed and it was found to contain 5360 units of vitamin A per gram. The product was then stored for 4½ months in contact with the atmosphere at 30° C. Assay of the product at the end of that time showed that it still contained 4990 units of vitamin A per gram. Since only about 7% of the vitamin A was destroyed, it is evident that the vitamin A is this product is highly stable even when the product is stored for a long period of time under conditions very conducive to the oxidative destruction of the vitamin A. As a further check on the stability of the vitamin A in the product of this example, 6 grams of the product obtained by admixing the spheroidal particles with the wheat germ flour, soybean meal and linseed meal were admixed with 144 grams of a mineral mixture made up of 40 parts of ground limestone, 40 parts of steamed bone meal and 16 parts of salt. All these materials have a strong tendency to cause the destruction of vitamin A. This mixture when assayed was found to contain 244 units of vitamin A per gram. It was then stored for 1½ months at 37° C. At the end of that time it was found to contain 222 units of vitamin A per gram. This is further proof that the vitamin A in the spheroidal particles is exceedingly stable to oxidizing influences.

*Example V*

In this example, a product essentially the same as that of the Example IV was prepared. The principal difference between the present product and that of the previous example was in the normally solid wax-like material which was employed. In the present example the microcrystalline wax of Example IV was replaced with esparto wax. The spheroidal particles were admixed with wheat germ flour, soybean meal and linseed meal as in the previous example. This mixture gave an initial assay for vitamin A of 5150 units of vitamin A per gram. After four months at 30° C. the product assayed 5170 units of vitamin A per gram thus showing that there had been absolutely no loss whatever of vitamin A even under the vigorous conditions employed during the long storage period. On admixing 6 grams of the product which had assayed 5150 units of vitamin A per gram with 144 parts of the mineral mixture used in Example IV, a product was obtained having an initial assay of 212 units of vitamin A per gram. After this product had been stored for 2 months in contact with the atmosphere at 37° C., it had a potency of 195 units of vitamin A per gram. This further demonstrated the outstanding stability of the vitamin A in the products of the invention.

*Example VI*

Another product of the invention was prepared by admixing 30 parts of dogfish liver oil with 30 parts of ozokerite, 20 parts of wheat germ flour, and 0.6 part of an edible antioxidant of the type employed in the previous examples along with 1.5 parts of soybean lecithin as a synergist therefor. These materials were admixed by heating the ozokerite until it was liquid and then slowly admixing the other materials therewith. The hot liquid product was then passed through a centrifugal apparatus of the type employed in the previous examples giving a multiplicity of small spheroidal particles. To test the stability of the product, 28.4 parts thereof were admixed with 21.6 parts of expeller soybean meal and 10 parts of the product thus obtained were admixed with 90 parts of the mineral mixture employed in Example IV. The initial assay of the product thus obtained was 210 units of vitamin A per gram. After one month at 37° C., the product assayed 208 units of vitamin A per gram. It is evident, therefore, that the product of the present example very effectively protects the vitamin A from oxidative destruction.

*Example VII*

In this example another product of the invention was prepared by melting 22.5 parts of microcrystalline wax and then admixing therewith 30 parts of a fish liver oil, 20 parts of bolted rice polish, and 0.13 part of an antioxidant of the type employed in the previous examples along with 0.33 part of soybean lecithin to serve as a synergist therefor. The hot liquid product was passed through a centrifugal apparatus as in the previous examples giving a multiplicity of small solid spheroidal particles. Forty parts of the spheroidal particles were admixed with 42 parts of expeller soybean meal and then 10 parts of the resulting product were admixed with 90 parts of the mineral mixture employed in the previous example. Initial assay of the final mixture showed that it contained 234 units of vitamin A per gram. After two months' storage at 37° C. the product still contained 209 units of vitamin A per gram thus clearly demonstrating the excellent stability of the product.

*Example VIII*

Another dry product containing fat-soluble vitamins in a highly stable form was prepared by heating to about 95° C. 210 parts of microcrystalline wax having a melting point of about 88° C. and then admixing therewith 285.4 parts of a fish liver oil containing vitamins A and D, 194.6 parts of wheat germ flour, 5 parts of an edible antioxidant of the type employed in the previous examples and 10 parts of soybean lecithin, all of which had been preheated to about 95° C. The hot liquid mixture was then passed through a spraying apparatus using a pressure of about 10 pounds per square inch and allowing the liquid droplets to travel through the atmosphere until they had solidified. The particles obtained had the same size and the same spheroidal shape as the products obtained in the previous examples. They also had the same excellent stability as the products of the previous examples.

*Example IX*

In this example a stable dry carrier for fat-soluble vitamins was prepared by melting 22.5 parts of microcrystalline wax and then admixing therewith 30 parts of fish liver oil, 20 parts of ground solvent-extracted soybean meal, and 0.26 part of an antioxidant of the type employed in the previous examples along with 0.66 part of soybean lecithin as a synergist therefor. The hot liquid product was passed through a centrifugal apparatus to form the composition into a multiplicity of small solid spheroidal particles. Forty parts of the product which was obtained were admixed with 42 parts of ground solvent-extracted soybean meal. Ten parts of this product were admixed with 90 parts of the mineral mixture referred to in Example IV and the mixture which resulted was then placed under accelerated storage tests at 37° C. The mixture had an initial potency of 220 units of vitamin A per gram, and after two months, storage at 37° C. in contact with the atmosphere it was found to have a potency of 208 units of vitamin A per gram. This clearly proved the outstanding stability of the vitamin A in the product of this example.

*Example X*

Two dry carriers for vitamin D were prepared employing in each case 54.6 parts of microcrystalline wax, 54.6 parts of a vitamin D concentrate, 1.05 parts of an edible antioxidant of the type employed in the previous examples, 2.62 parts of soybean lecithin to serve as a synergist for the antioxidant, and 37.2 parts of wheat germ flour. In one of the dry carriers, the vitamin D concentrate which was employed was a vitamin $D_2$ concentrate having a potency of 2,700,000 U. S. P. units per gram; and in the other dry carrier, the vitamin D concentrate which was employed was a vitamin $D_3$ concentrate having a potency of 1,210,000 A. O. A. C. units per gram. The two dry carriers were prepared by the same procedure employed in Example VIII, i. e. by forming a hot liquid mixture of the ingredients and passing the hot liquid mixture through a spraying apparatus and allowing the liquid droplets to travel through the air until they had solidified. Both of the dry carriers had the same excellent characteristics as the products of the previous examples.

*Example XI*

Another one of the dry carriers of our invention was prepared in the same manner as in Example I, employing the same ingredients and the same ratios of ingredients as in Example I, with the exception that the 20 parts of esparto wax employed in Example I were replaced in the present example with 40 parts of hydrogenated soybean oil having a melting point of about 65° C. The product obtained had the same excellent resistance to oxidative destruction of the vitamins therein as the product of Example I.

*Example XII*

Another product of the invention was prepared by heating 21.0 parts of microcrystalline wax having a melting point of about 88° C. to 90° C. to a temperature of about 95° C. and then admixing therewith 27.93 parts of a fish liver oil having a vitamin A potency of 26,400 U. S. P. units per gram, 0.075 part of a vitamin $D_3$ concentrate having a potency of 2,100,000 A. O. A. C. units per gram, 19.3 parts of wheat germ flour, 0.5 part of an edible antioxidant of the type employed in the previous examples, and 1.0 parts of soybean lecithin to serve as a syngerist for the antioxidant, all of which had been preheated to a temperature of about 95° C.; and then forming the hot liquid mixture into a multiplicity of small solid spheroidal particles by passing it through a spraying apparatus as in Examples VIII and X. The product had the same excellent stability as the products of the previous examples.

*Example XIII*

A dry carrier of the invention containing synthetic vitamin A acetate was prepared from 5.00 parts of synthetic vitamin A acetate, 10.00 parts of esparto wax, 9.04 parts of wheat germ flour, 0.15 part of an edible antioxidant of the type employed in the previous examples, and 0.375 part of soybean lecithin. The product was prepared in a centrifugal apparatus as in Example I. 12.28 parts of the dry carrier were dusted with 0.645 part of wheat germ flour and the product then assayed for vitamin potency. It had an initial assay of 243,000 units of vitamin A per gram. The product was then stored for six weeks in contact with the atmosphere at a temperature of 45° C. and then assayed again. It was found that the very severe conditions of storage had destroyed only about 20% of the vitamin A since the product assayed 192,000 units per gram of vitamin A at the end of the storage period.

Still another class of novel and highly useful compositions containing vitamin A and/or D in which the vitamin content thereof is highly stable and available or digestible may be prepared by replacing a small proportion of said wax-like material (a) with normally solid resinous ethyl cellulose capable of forming a solid solution with the combination of the wax-like material, the vitamin bearing material, and the antioxidant. For this purpose, it is recommended that approximately 3-25 parts of the ethyl cellulose resin be employed per 100 parts of the wax-like material. When such a resin is employed, it may be mixed with the wax-like material and such combinations may be heated to the temperature wherein they both melt or the ethyl cellulose goes into solution in the melted wax-like material. Even more than 25% of the wax-like material may be replaced by the resin if desired. As a matter of fact, the quantity of wax-like material which may be replaced by the resin in general is between 3-100% of the weight of the wax-like material. When all of the wax-like material is replaced by ethyl cellulose, the latter must be capable of forming a solid solution with the vitamin bearing material and the antioxidant. It has been discovered that the presence of the resin, either in combination with the wax-like material in all various proportions, or alone, materially aids in maintaining the vitamin A potency of the finished products. In addition, the resin imparts highly desirable physical characteristics, namely hardness and excellent flow of the finished solid product.

Though the ethoxyl content and viscosity of ethyl cellulose have a profound influence on its physical properties, it has been found that all of the commercially available forms, ranging in ethoxyl content from 44.5% to approximately 50%, and in viscosity from 6 to 250 centipoises at 25° C. for a 5% solution in appropriate organic solvents, have been found useful.

According to this aspect of the invention, ethyl cellulose resins together with one or a combination of two or more of said wax-like materials in the ratio by weight of 3-100 parts of the former to 97-0 parts of the latter may be heated together to a temperature at which solution takes place. Then a mix consisting of one or more of said antioxidants together with one or more of said fat-soluble-vitamin-containing materials and a quantity of one or more of said vegetable flours are mixed with each other in a separate container and there heated to an elevated temperature. The first prepared liquid solution is now cooled to a temperature below the melting point of the resin but is maintained at a temperature slightly above that required to prevent the solution from being converted to the solid state. Then the other mixture at elevated temperature is added to said resin-wax-like material and is thoroughly mixed therewith to obtain a uniform fluid mass with all of the components except the flour being in the liquid state, and the particles of flour being uniformly distributed therethrough or suspended therein. For this purpose, the proportion of flour in said liquid mass at elevated temperature may be in the range of 5–50% by weight. Subsequently this fluid mass may be converted or formed into droplets or globules in the liquid state and then the temperature thereof is reduced to convert them to the solid state. Spraying, that is either pressure spraying or centrifugal spraying, is one means of accomplishing this purpose. It is preferable that in carrying out this particular process in which the resin is employed to conduct all of the steps in an oxygen-free and inert atmosphere and also to maintain as low as possible the period the vitamin-bearing material is at elevated temperature. The resultant product produced in this manner consists essentially of a multiplicity of small spheroidal beads practically all passable through a 10 mesh screen and retainable on a 200 mesh screen, with said spheroidal particles comprising essentially (A) a material selected from the group consisting of a wax-like material and ethyl cellulose in the proportions by weight of 0–97 parts of the former to 100–3 parts of the latter, (B) one or a combination of two or more of said vitamin-containing materials, (C) one or a combination of two or more of said vegetable flours, and (D) one or more of said edible antioxidants present in minor proportions, with A, B and D being in solid solution and having dispersed therein said vegetable flour as discrete particles, the ratio by weight of (C) to the combined weights of A and B being approximately 1–1 to 1–19, and the quantity of A in said particles measuring 15–50% of the weight thereof.

This application is a continuation-in-part of our copending application 99,116 filed June 14, 1949, now abandoned.

We claim:

1. A highly stable fat-soluble-vitamin-containing composition of matter wherein the fat-soluble vitamin content is available biologically, said composition of matter comprising a multiplicity of small, substantially solid spheroidal particles consisting essentially of (a) normally solid wax-like material having a melting point of at least 45° C., (b) fat-soluble-vitamin-containing material selected from the group consisting of fat-soluble vitamin A containing material and fat-soluble vitamin D containing material, (c) vegetable flour and (d) edible antioxidant, said substances a, b, c and d being intimately combined with each other, said composition having been produced by forming (a), (b), (c) and (d) into a substantially uniform molten mass, thereafter forming very small fluid droplets from the molten mass and projecting the very small droplets through the air until they are substantially solidified, said spheroidal particles having (a), (b) and (d) in substantially solid solution forming a continuous phase with particles of (c) suspended therein and measuring about 5% to about 50% of the combined weights of (a), (b), (c) and (d), the quantity by weight of (a) in said spheroidal particles measuring between 15% and 60% of the total weight thereof, and substantially all of said spheroidal particles passable through a 10 mesh screen and retainable on a 100 mesh screen.

2. A composition of matter defined in claim 1, wherein (a) is mineral wax.

3. A composition of matter defined in claim 1, wherein (a) is esparto wax.

4. A composition of matter defined in claim 1, wherein (a) is hydrogenated glyceride oil having an iodine value no greater than 5.

5. A composition of matter defined in claim 1, wherein (a) is natural vegetable wax.

6. A composition of matter defined in claim 1, wherein (b) is fat-soluble vitamin A containing material.

7. A composition of matter defined in claim 1, wherein (c) is wheat germ flour.

8. A composition of matter defined in claim 1, wherein (a) is mineral wax, (b) is a normally liquid fat-soluble vitamin A containing material and (c) is wheat germ flour.

References Cited in the file of this patent
UNITED STATES PATENTS

| Number | Name | Date |
|---|---|---|
| 1,764,085 | Placak | June 17, 1930 |
| 2,195,595 | Nitardy | Apr. 2, 1940 |
| 2,206,113 | Nitardy | July 2, 1940 |
| 2,401,293 | Buxton | June 4, 1946 |
| 2,426,762 | Chanin | Sept. 2, 1947 |
| 2,496,634 | Melnick | Feb. 7, 1950 |
| 2,685,517 | Dunmire | Aug. 3, 1954 |

OTHER REFERENCES

Sandell: Quarterly Jour. of Pharmacy and Pharmacology, January–March 1947, page 68. (Copy in Div. 43.)

Brocklesby: Marine Animal Oils, Bulletin No. LIX (1941), pages 200 to 203. (Copy in Sci. Libr.)